UNITED STATES PATENT OFFICE.

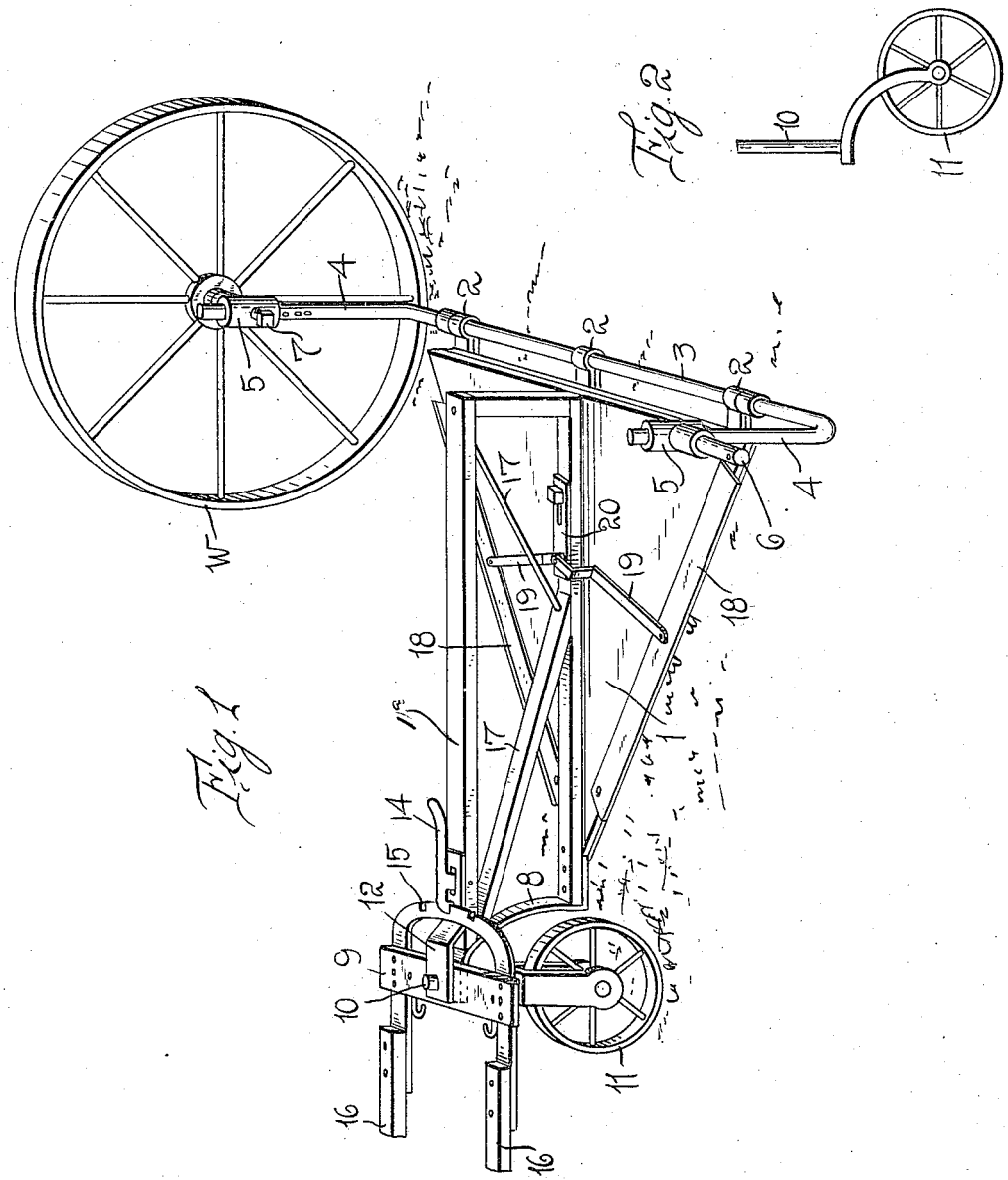

EDWARD C. VARNER, OF MANSFIELD, OHIO.

CORN-HARVESTER.

1,242,084. Specification of Letters Patent. Patented Oct. 2, 1917.

Application filed March 8, 1917. Serial No. 153,424.

*To all whom it may concern:*

Be it known that I, EDWARD C. VARNER, a citizen of the United States, residing at Mansfield, in the county of Richland and State of Ohio, have invented certain new and useful Improvements in Corn-Harvesters, of which the following is a specification, reference being had to the accompanying drawings.
This invention relates to certain improvements in corn harvesters and it is an object of the invention to provide a device of this general character of a novel and improved construction whereby the same may be adjusted to meet conditions, such as hillsides and very rough ground.

It is also an object of the invention to provide a novel and improved device of this character including a platform and main supporting wheels for said platform and wherein said platform is capable of swinging movement relative to the supporting wheels so that in the event of either or both of the supporting wheels striking an obstruction, the jar upon the platform will be substantially entirely eliminated.

The invention consists in the details of construction and in the combination and arrangement of the several parts of my improved corn harvester whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in perspective of a corn harvester constructed in accordance with an embodiment of my invention, one of the main supporting wheels being omitted; and Fig. 2 is a view in elevation of a type of caster wheel which may be employed in my improved device.

As disclosed in the accompanying drawings, 1 denotes a platform substantially V-shape in form with its apex forwardly directed. Extending rearwardly of the platform 1 are the bearings 2 through which is loosely directed the intermediate portion of the shaft 3.

The shaft 3 is substantially U-shape in form and the arms 4 thereof are directed through the sleeves 5 carried by the inner ends of the spindles 6. Mounted upon the spindles 6 are the main supporting wheels W preferably of a materially large diameter so that the travel of the device may be materially facilitated.

Threaded through the sleeves 5 are the binding screws 7 whereby it will be perceived that said sleeves 5 may be effectively held at different positions longitudinally of the arms 4 which the necessities of practice require. It will also be self-evident that the sleeves 5 will permit the spindles 6 to be arranged at different angles relative to the longitudinal axis of the platform as the necessities of practice may require. This adjustment of the sleeves 5 is of particular advantage when the device is adapted for use upon a hillside.

The apex portion of the platform 1 is provided with the upwardly directed and forwardly disposed arcuate arm 8. Resting upon the upper portion of the arm 8 is the cross member 9 and rotatably disposed through the upper portion of said arm 8 and the cross member 9 is the stem or shank 10 of the caster wheel 11. Fixed to the forward end portion of the longitudinally disposed beam 1ª carried by and positioned above the platform 1 is a forwardly directed arm 12 through which the shank or stem 10 is also loosely directed whereby the cross member 9 is capable of swinging movement. Extending inwardly from the member 9 is the arcuate rack 15 with which co-acts the latch 14 carried by the beam 1ª so that the shafts 16 may be locked in rigid relation to the platform 1 in various positions so that the guiding of the machine will be under control of the main supporting wheels W.

With the use of my improved device the caster wheel 11 serves mainly for the support of the forward portion of the device and to facilitate turning the machine around. It will be perceived however that by locking the cross member 9 in a predetermined position the machine may be caused to travel at such an angle as to properly follow a row of corn or other grain without creeping down on a hillside.

Coacting with the arm 8 are the bracing members 17 coacting with the upper portion of said arm and with the platform 1. Pivotally engaged at their forward ends with the forward portion of the side margins of the platform 1 are the cutting blades 18 for a purpose which is believed to be self-evident. Operatively engaged with the rear portions of the cutting blades 18 are the links 19 also operatively engaged with the sliding member 20 whereby it will be perceived that when said member 20 is moved rearwardly the cutting edges of the blades 18 are drawn inwardly over the platform 1 so that the blades are rendered inoperative. This is of particular advantage when the device is not in use. In operation sufficient weight is placed upon the platform 1 to prevent the raising of the cutting blades 18 to a height detrimental to the successful operation of the device. It has been fully demonstrated in actual practice that the weight of two persons standing upon the platform 1 suffices to hold the platform 1 in working position as the harvester is drawn forwardly. At the most the platform 1 cannot be drawn above the spindles 6 and the extent of possible upward swinging movement of the platform 1 can be readily controlled by adjusting the sleeves 5 longitudinally of the arms 4.

From the foregoing description, it is thought to be obvious that a corn harvester constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A device of the character described comprising a platform provided with cutting means, bearings extending rearwardly of the platform, a shaft loosely disposed through said bearings and terminating in upstanding arms, spindle-carrying sleeves engageable with said arms and movable longitudinally thereof and axially therearound, supporting wheels mounted upon the spindles, and supporting means for the forward end portion of the platform.

2. A device of the character described comprising a platform provided with cutting means, bearings extending rearwardly of the platform, a shaft loosely disposed through said bearings and terminating in upstanding arms, spindle-carrying sleeves engageable with said arms and movable longitudinally thereof and axially therearound, supporting wheels mounted upon the spindles, a vertically disposed stem rotatably supported by the forward portion of the platform, a wheel operatively engaged with the stem, and means for holding the stem against rotation.

3. A device of the character described comprising a platform provided with cutting means, bearings extending rearwardly of the platform, a shaft loosely disposed through said bearings and terminating in upstanding arms, spindle - carrying sleeves engageable with said arms and movable longitudinally thereof and axially therearound, supporting wheels mounted upon the spindles, a vertically disposed stem rotatably supported by the forward portion of the platform, a wheel operatively engaged with the stem, a lever secured to the stem for imparting rotation thereto, and means for holding the lever against movement.

In testimony whereof I hereunto affix my signature in the presence of two witnesses.

EDWARD C. VARNER.

Witnesses:
R. B. McCrory,
Wilber F. Varner.

Copies of this patent may be obtained for five cents each, by addressing the "Commissioner of Patents, Washington, D. C."